United States Patent [19]

Monk et al.

[11] 4,074,801

[45] Feb. 21, 1978

[54] BULK MATERIAL RECLAIMING APPARATUS

[75] Inventors: James T. Monk, Louisville; James L. Hailey, Noxapater; Tonnie M. Boyles, Louisville, all of Miss.

[73] Assignee: Taylor Machine Works, Inc., Louisville, Miss.

[21] Appl. No.: 729,104

[22] Filed: Oct. 4, 1976

[51] Int. Cl.² ............................................. B65G 65/28
[52] U.S. Cl. ..................................... 198/304; 198/318; 198/519; 198/520; 198/735; 198/861
[58] Field of Search ............... 198/304, 312, 315, 316, 198/318, 511, 519, 520, 728, 730, 735, 838, 841, 860, 861, 865, 508; 51/8 B, 8 R, 14, 215 E; 214/10

[56] References Cited

U.S. PATENT DOCUMENTS

| 1,851,380 | 3/1932 | Briggs | 198/838 |
| 2,710,683 | 6/1955 | McClenny | 198/841 |
| 3,618,744 | 11/1971 | Hulette | 198/519 |
| 3,658,169 | 4/1972 | Potthoff | 198/519 |
| 3,675,756 | 7/1972 | Nass | 198/508 |

FOREIGN PATENT DOCUMENTS

| 1,171,076 | 11/1969 | United Kingdom | 198/519 |

Primary Examiner—Evon C. Blunk
Assistant Examiner—Joseph E. Valenza
Attorney, Agent, or Firm—John R. Walker, III

[57] ABSTRACT

An apparatus for use in reclaiming bulk material such as bean meal or the like from a pile of such material. A self-propelled wheeled vehicle is equipped with an elongated boom. An endless belt-like member is movably positioned along the length of the boom. A plurality of platelike blades are attached to the endless belt-like member for movement along the length of the boom so that when the boom is positioned against or adjacent a pile of bulk material, the platelike blades will scrape, rake or otherwise convey portions of the bulk material from the pile to an under-floor conveyor or the like.

4 Claims, 7 Drawing Figures

BULK MATERIAL RECLAIMING APPARATUS

BACKGROUND OF THE INVENTION

1. Field of the Invention

This invention relates to apparatuses for use in reclaiming material such as soybeal meal, cottonseed meal, chips or the like from a pile of such material.

2. Description of the Prior Art

Certain material such as soybean meal, cottonseed meal and the like is set up in a pile after being processed. When such material is to be further processed, used, sold or the like, it is normally tranferred, from the pile to an under-floor conveyor or the like which, in turn, conveys the material to its end designation. This procedure is commonly referred to as "reclaiming" the material from the pile thereof. Devices such as front-end loaders, shovel type machines, backhoes, draglines, and the like can be used to transfer, or reclaim, such material from the pile. However, the capabilities of such devices are limited when the piles are high and, particularly, when the material must be stored within a building or the like as is the case with bean meal and other agricultural products. Also, safety factors prohibit the use of chip and bark fuel type installation dozers on top of such piles on account of cave-offs and the like.

Applicants are aware of the following U.S. patents: Smith, U.S. Pat. No. 3,381,803; Strocker et al, 3,487,910; Smith, 3,500,988; Hulette, 3,618,744; and Fischer, 3,621,977. None of these patents disclose, teach or suggest the present invention.

SUMMARY OF THE INVENTION

The present invention is directed towards overcoming the problems and disadvantages of prior apparatuses for use in reclaiming bulk material such as soybean meal, cottonseed meal, chips and the like from a pile of such material. The concept of the present invention is to provide a self-propelled wheeled vehicle with an elongated boom means pivotally attached at its aft end to the front end of the wheeled vehicle in a position substantially coaxially aligned with the wheeled vehicle. An endless belt means is positioned about the boom means and is caused to move along the boom means by a drive means which is operatively coupled thereto. Blade means are attached to the endless belt means for moving with the endless belt means to scrape, rake or otherwise convey the bulk material from a pile of such material when the boom means is positioned against such a pile.

DESCRIPTION OF THE PREFERRED EMBODIMENT

Figures 1, 2:
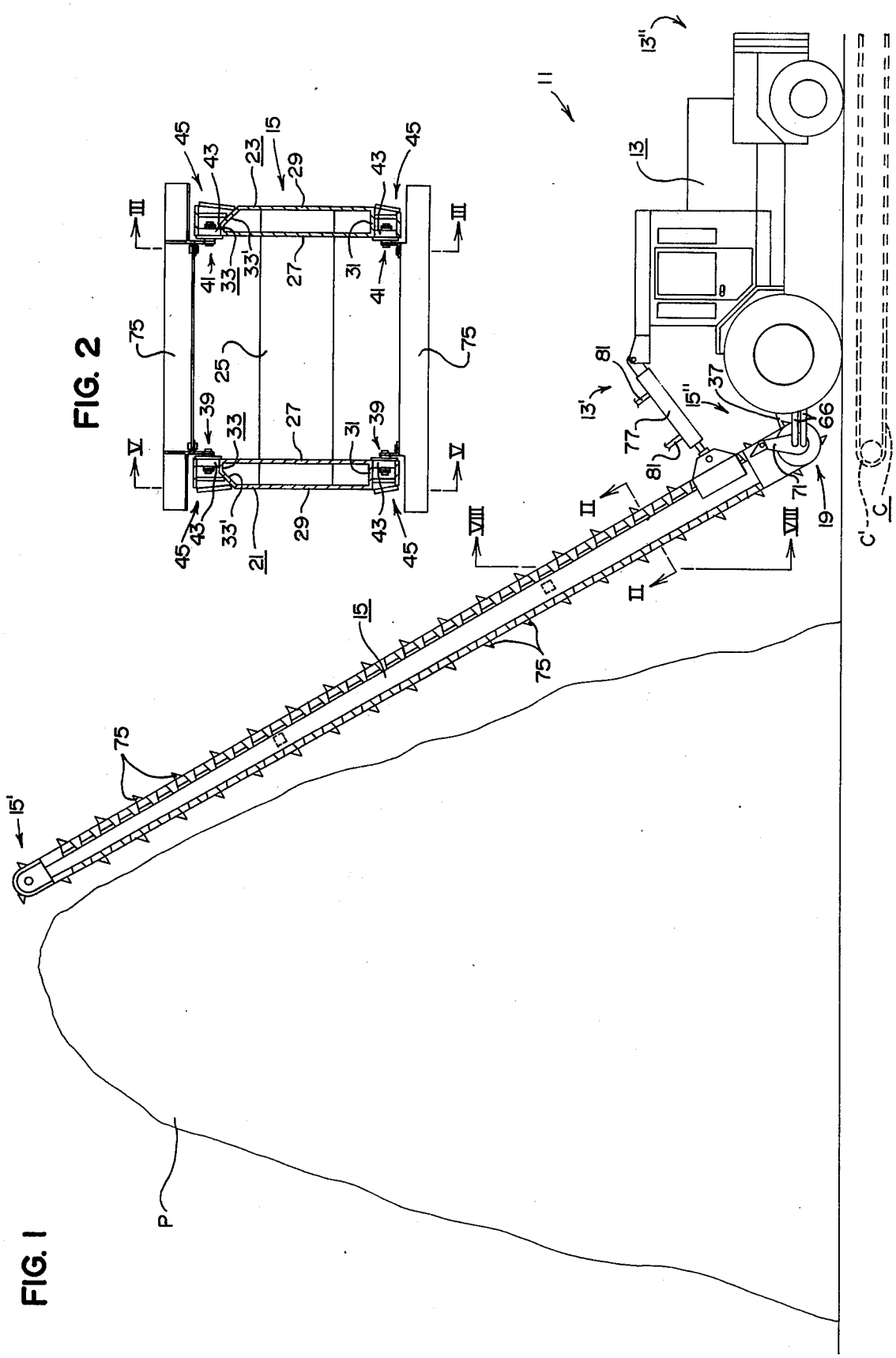
FIG. 1 is a side elevational view of the apparatus of the present invention shown positioned adjacent a pile of bulk material and over an under-floor conveyor.
FIG. 2 is a sectional view of a portion of the apparatus of the present invention as taken on line II—II of FIG. 1 with some parts removed for clarity.
Figure 3:
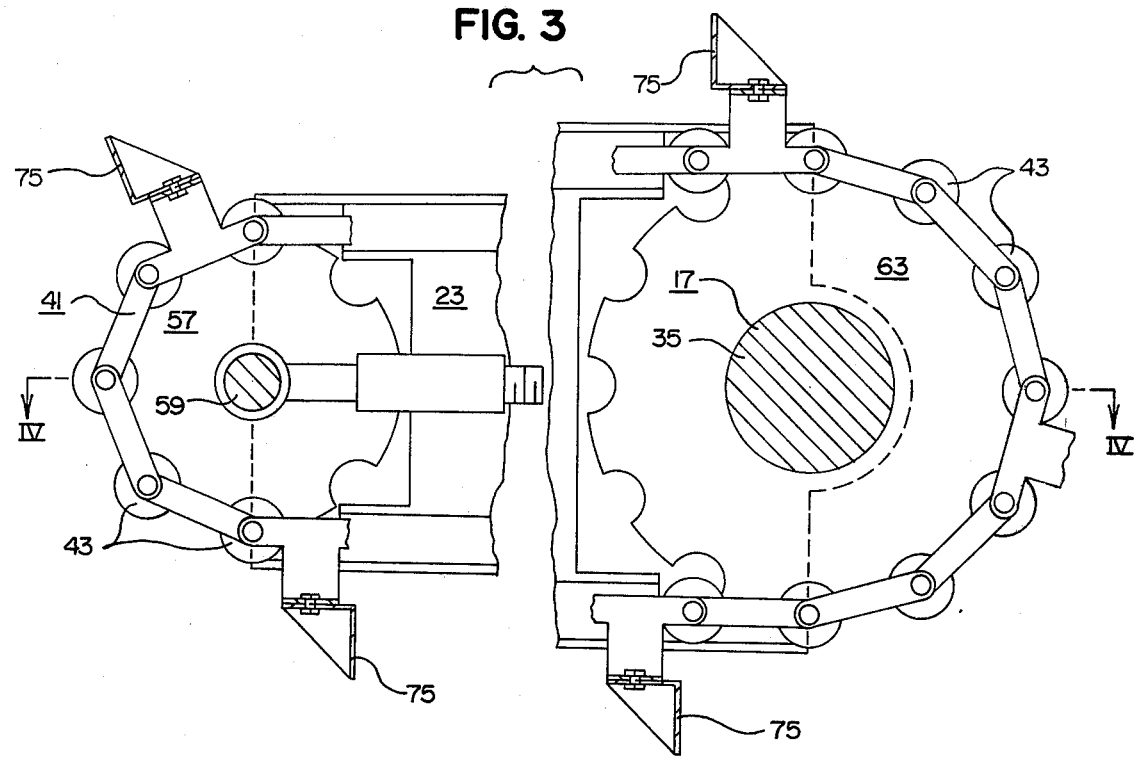
FIG. 3 is a sectional view of a portion of the apparatus of the present invention as taken on line III—III of FIG. 2 with some parts removed and broken away for clarity.

The apparatus 11 of the present invention is for use in "reclaiming" bulk material such as soybean meal, cottonseed meal, chips, or the like from a pile P of such material (see FIG. 1). That is, the apparatus 11 is for scraping, raking or otherwise conveying or transferring portions of such bulk material from such a pile P to another location such as through an access opening (not shown) or the like to an under-floor conveyor C where the material is further processed, stored, conveyed to another location or to a different transportation system, or the like. The apparatus 11 includes, in general, a self-propelled wheeled vehicle 13 having a front end 13' and a rear end 13"; an elongated boom means 15 having a force end 15' and an aft end 15"; pivot means 17 for pivotally mounting the aft end 15" of the boom means 15 to the front end 13' of the wheeled vehicle 13 preferably with the longitudinal axis of the boom means 15 being in a vertical plane which passes through the longitudinal axis of the wheeled vehicle 13; an endless belt-like means movably positioned about the boom means 15; drive means 19 operatively coupled to the endless belt-like means for selectively causing the endless belt-like means to move along the boom means 15; and blade means attached to the endless belt-like means for moving with the endless belt-like means to scrape, rake or otherwise convey or transfer bulk material from the pile P of such material when the boom means 15 is positioned against the pile P.

The wheeled vehicle 13 may be of any type self-propelled mobile vehicle well known to those skilled in the art. Preferably, the wheeled vehicle 13 has the characteristics of a lift truck type chassis. That is, the wheeled vehicle 13 preferably has a short wheel base so that the wheeled vehicle 13 has good maneuverability, has a drive train capable of exerting high pull at the wheels, and has reasonably high floatation to give the wheeled vehicle 13 better traction and the like when positioned directly over the material being moved. The wheeled vehicle 13 preferably includes a source of hydraulic power for reasons which will hereinafter become apparent.

The boom means 13 preferably includes a first elongated substantially boxlike member 21, a second elongated substantially boxlike member 23 and means such as the cross members 25 for joining the first and second boxlike members 21, 23 together in a spaced-apart side-by-side relationship (see FIG. 2). Each of the first and second boxlike members 21, 23 is preferably constructed in a hollow boxlike manner with an elongated inner side member 27, an elongated outer side member 29, an elongated bottom member 31, and an elongated top member 33 fixedly joined together in any manner apparent to those skilled in the art such as by welding or the like (see, in general, FIGS. 2 and 6). A portion 33' of the top member 33 adjacent the outer-side member 29 may be angled downwardly and outwardly for reasons which will hereinafter become apparent.

Figure 4:
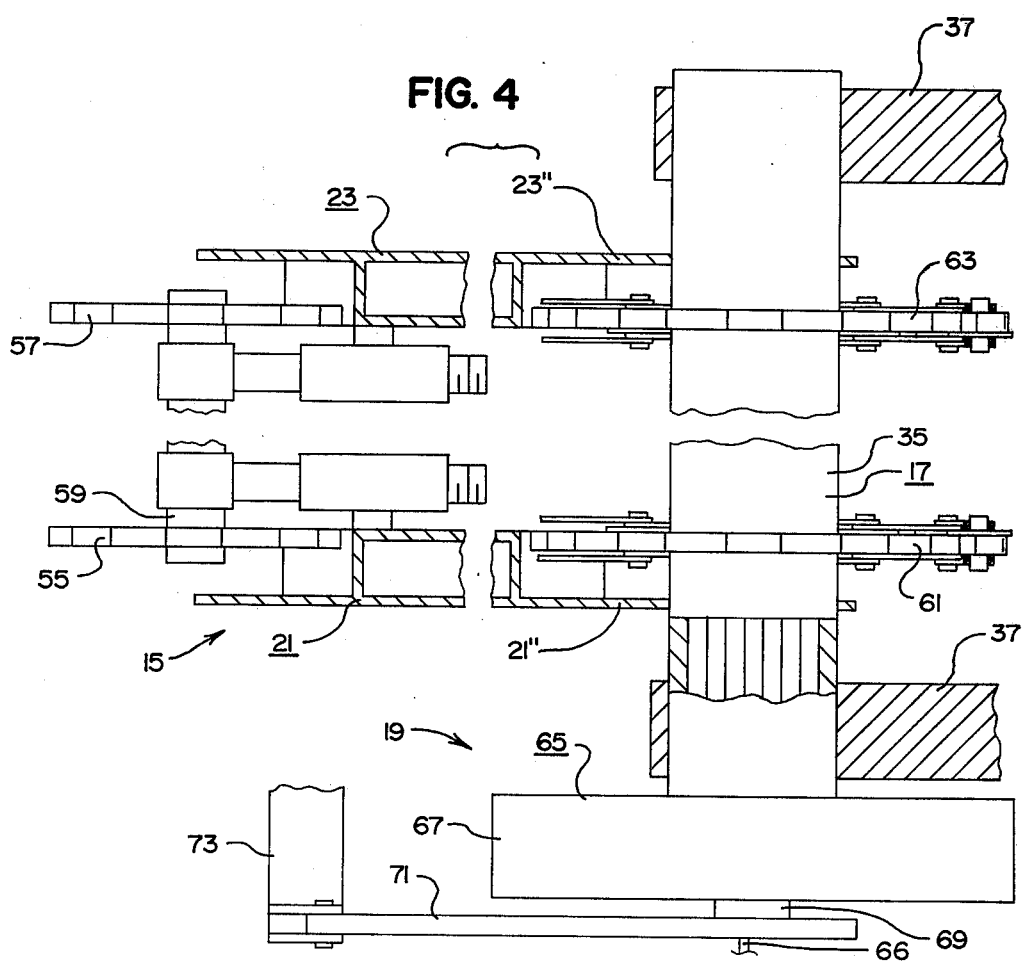
FIG. 4 is a sectional view of a portion of the apparatus of the present invention as taken on line IV—IV of FIG. 3 with some parts removed and boken away for clarity.
Figure 5:
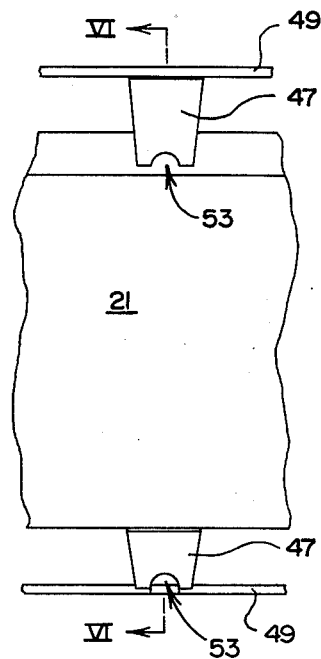
FIG. 5 is a side elevational view of a portion of the apparatus of the present invention as taken on line V—V of FIG. 2 with some parts removed and broken away for clarity.

The pivot means 17 preferably includes a pivot rod 35 rotatably mounted to the front end 13' of the wheeled vehicle 13 by way of a pair of arm members 37 or the like (see, in general, FIG. 4). The aft end 15" of the boom means 15 is pivotally mounted to the pivot rod 35. That is, the aft ends 21", 23" of the first and second boxlike members 21, 23 are pivotally mounted to the pivot rod 35 in any manner apparent to those skilled in the art. The pivot means 17 may be provided with bearings, grease fittings, and the like (now shown) for allowing the boom means 15 to freely pivot relative to the front end 13' of the wheeled vehicle about a substantially horizontal axis extending coaxially with the axis of pivot rod 35.

The endless belt-like member preferably includes a first endless chain member 39 movably positioned about the first boxlike member 21 of the boom means 15 and preferably includes a second endless chain member 41 movably positioned about the second boxlike member 23 of the boom means 15 (see in general, FIG. 2). Each of the first and second endless chain members 39, 41 includes a pivotally connected series of metal links or the like to form an endless drive chain in any manner apparent to those skilled in the art. Each of the first and second endless chain members 39, 41 preferably includes a plurality of roller members 43 pivotally mounted thereon in a manner well known to those skilled in the art for allowing the first and second endless chain members 39, 41 to roll along the first and second boxlike members 21, 23 of the boom means 15.

Figure 6:
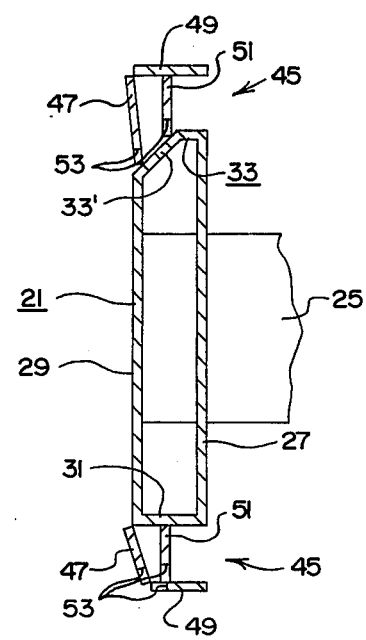
FIG. 6 is a sectional view of a portion of the apparatus of the present invention as taken on line VI—VI of FIG. 5 with some parts removed and broken away for clarity.

The apparatus 11 may include guide means attached to the boom means 15 for guiding the endless belt-like means lengthwise around the boom means. The guide means is preferably of an open construction for alleviating any trappage of any of the bulk material being reclaimed by the apparatus 11 within the guide means. The guide means preferably includes a plurality of substantially C-shaped members 45 mounted on the upper and lower edges of the first and second boxlike members 21, 23 (see, in general, FIGS. 2 and 6). Each substantially C-shaped member 45 includes a substantially vertical member 47 fixedly attached to the bottom or top member 31, 33 of the first or second boxlike member 21, 23 of the boom means 15 by any means apparent to those skilled in the art such as by welding and includes a substantially horizontal member 49 fixedly attached to the outer end of the vertical member 47 substantially as shown in FIG. 6. As thus constructed, each substantially C-shaped member 45 is defined by the bottom or top member 31, 33 of the first or second boxlike member 21, 23 of the boom means 15, the vertical member 47, and the horizontal member 49. Each C-shaped member 45 may be provided with a secondary vertical member 51 interposed between the horizontal member 49 and the bottom or top member 31, 33 of the first or second boxlike member 21, 23 of the boom means 15 for giving each substantially C-shaped member 45 greater strength and the like. Each of the substantially C-shaped members 45 of the guide means preferably includes an opening 53 therethrough adjacent the lowermost portion thereof for allowing passage therethrough of the bulk material being reclaimed by the apparatus 11 thereby further alleviating any trappage of any of the bulk material within the guide means. More specifically, the opening 53 is provided through the vertical member 47 and the secondary vertical member 51 and, for the substantially C-shaped members 45 attached to the lower edges of the first and second boxlike members 21, 23, through the horizontal member 49 substantially as shown in FIG. 6. For the substantially C-shaped members 45 that are mounted on the upper edges of the first and second boxlike members 21, 23, the downwardly angled portions 33' of the top members 33 of the first and second boxlike members 21, 23 allow any bulk material which enters such substantially C-shaped members 45 to pass through the openings 53 in the vertical member 47 and the secondary vertical member 51 aided by the force of gravity.

The guide means preferably includes a first cog member 55 rotatably mounted on the fore end 15' of the boom means 15 for engaging the first endless chain member 39 and includes a second cog member 57 rotatably mounted adjacent the fore end 15' of the boom 15 for engaging the second endless chain member 41 (see FIG. 4). Preferably, a pivot rod 59 is rotatably mounted to the first and second boxlike members 21, 23 of the boom means 15 and the first and second cog members 55, 57 are preferably fixedly attached to the pivot rod 59. The pivot rod 59 may be adjustably mounted relative to the boom means 15 for allowing the tension of the first and second endless chain members 39, 41 to be varied and the like. Additionally, the guide means preferably includes a first cog member 61 rotatably mounted adjacent the aft end 15" of the boom means 15 for engagement with the first endless chain member 39 and preferably includes a second cog member 63 rotatably mounted adjacent the aft end 15" of the boom means 15 for engagement with the second endless chain member 41 (see FIG. 4). The first and second cog members 61, 63 are preferably fixedly mounted on the pivot rod 35 of the pivot means 17.

The drive means 19 is preferably coaxially aligned with the pivot means 17 (see, in general, FIG. 4). More specifically, the drive means 19 is preferably a radial piston hydraulic motor 65 mounted coaxially of the pivot rod 35 of the pivot means 17 and adapted to cause the pivot rod 35 to rotate. The hydraulic motor 65 is preferably operatively coupled to the source of hydraulic power of the wheeled vehicle 13 by way of hydraulic lines 66. It should be apparent that when the pivot rod 35 is caused to rotate, the first and second cog members 61, 63 will be caused to rotate thereby causing the first and second endless chain members 39, 41 of the endless belt-like means to rotate about the first and second boxlike members 21, 22 of the boom means 15. The outer causing 67 of the radial piston hydraulic motor 65 of the drive means 19 is preferably fixedly mounted to the pivot rod 35 in any manner apparent to those skilled in the art such as by splines or the like. The crank shaft 69 of the radial piston hydraulic motor 65 is preferably nonrotatably mounted to the boom means 15. More specifically, the apparatus 11 may be provided with an armlike member 71 fixedly attached to the crank shaft 69 of the radial piston hydraulic motor 65 and to the boom means 15 to thereby nonrotatably attach the crank shaft 69 of the radial piston hydraulic motor 65 to the boom means 15. The boom means 15 may be provided with an outwardly extending member 73 for allowing the armlike member 71 to be fixedly attached thereto. Thus, when the radial piston hydraulic motor 65 of the drive means 19 is activated, the outer casting 67 thereof will rotate and will cause the pivot rod 35 to rotate. Hagglund, a Swedish company, manufactures a radial piston hydraulic motor which can be used for the drive means 19 of the apparatus 11. The Hagglund radial piston hydraulic motor is marketed in the United States by the Bird-Johnson Company of Walpole, Mass.

The blade means of the apparatus 11 preferably includes a plurality of substantially platelike blade members 75. Each of the blade members 75 is preferably attached to the first and second endless chain members 39, 41 in any manner apparent to those skilled in the art and preferably extends transversely of the first and second boxlike members 21, 23 of the boom means 15 as clearly shown in FIG. 2. Each of the blade members 75 preferably extends outwardly past the first and second boxlike members 21, 23 of the boom means 15 as clearly shown in FIG. 2 so as to effect a cave off of the bulk material in the pile P when the apparatus is used to reclaim material from the pile P thereby increasing the efficiency of the apparatus 11 as will be apparent to those skilled in the art.

The apparatus 11 preferably includes piston means for causing the boom means 15 to pivot relative to the wheeled vehicle 13. The piston means preferably includes a first piston member 77 having a first end 77' pivotally attached to the wheeled vehicle 13 and having a second end 77" pivotally attached to the first boxlike member 21 of the boom means 15 (see FIG. 7). Additionally, the piston means preferably includes a second piston member 79 pivotally attached to the wheeled vehicle 13 having a first end 79' pivotally attached to the wheeled vehicle 13 and having a second end 79" pivotally attached to the second boxlike member 23 of the boom means 15 adjacent the aft end 23" thereof (see FIG. 7) so that extending or retracting the first and second piston means 77, 79 will cause the boom means 15 to pivot about the pivot rod 35 of the pivot means 17 so that the boom means 15 can be raised or lowered. The first and second piston means 77, 79 are preferably hydraulically activated and operatively coupled to the source of hydraulic power of the wheeled vehicle 13 by way of hydraulic lines 81 or the like.

Figure 7:
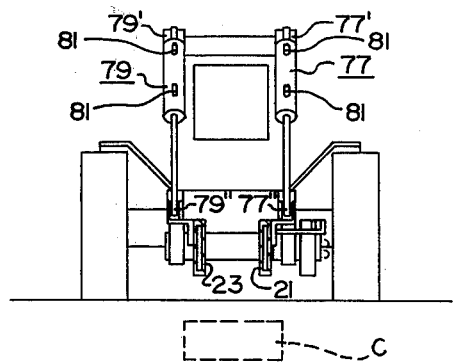
FIG. 7 is a sectional view of a portion of the apparatus of the present invention as taken on line VII—VII of FIG. 1 with some parts rotated and removed for clarity.

The preferred method of operation of the apparatus 11 is quite simple. For example, when the apparatus 11 is used to convey bulk material from a pile P thereof to an under-floor conveyor C, the wheeled vehicle 13 may be positioned substantially over the access opening (not shown) adjacent the intake end C' of the under-floor conveyor C substantially coaxially aligned therewith as shown in FIGS. 1 and 7. Next, the boom means 15 is adjusted by way of the piston means so as to cause the blade means to make contact with the pile P. Next, the drive means 19 is activated to cause the endless belt-like means to rotate in a counterclockwise direction as viewed in FIG. 1 thereby causing the blade means to scrape, rake or otherwise convey or transfer bulk material from the pile P thereof to the intake end C' of the under-floor conveyor C.

Although the invention has been described and illustrated with respect to a preferred embodiment thereof, it is not to be so limited since changes and modifications may be made therein which are within the full intended scope of the invention.

We claim:

1. Apparatus for reclaiming bulk material from a pile of such material, said apparatus comprising: a self-propelled wheeled vehicle; elongated boom means including a first elongated substantially boxlike member having fore and aft ends, a second elongated substantially boxlike member having fore and aft ends, and means for joining said first and second boxlike members together in a spaced-apart side-by-side relationship; pivot means for pivotally mounting said aft ends of said first and second boxlike members to said wheeled vehicle; endless belt-like means movably positioned about said boom means, said endless belt-like means including a first endless chain member movably positioned about said first boxlike member of said boom means and a second endless chain member movably positioned about said second boxlike member of said boom means, each of said first and second endless chain members including a plurality of roller members; guide means attached to said boom means for guiding said endless belt means lengthwise around said boom means, said guide means including a plurality of substantially C-shaped members mounted on the upper and lower edges of said first and second boxlike members of said boom means and being inwardly directed, each of said C-shaped members having an outwardly-directed opening therethrough adjacent the lowermost portion thereof for allowing passage therethrough of the bulk material being reclaimed by said apparatus thereby alleviating any trappage within said guide means of any of the bulk material, each of said C-shaped members mounted on the upper edges of said first and second boxlike members having a downwardly and outwardly angled bottom portion for allowing bulk material to pass through said opening thereof aided by the force of gravity, said roller members of said first and second endless chain members traveling within said C-shaped members of said guide means so that said first and second endless chain members are guided lengthwise around said first and second boxlike members respectively; drive means operatively coupled to said endless belt-like means for selectively causing said endless belt-like means to move along said boom means, said pivot means and said drive means being coaxially aligned with one another; and blade means attached to said endless belt-like means for moving with said endless belt-like means to reclaim bulk material from a pile of such material when said boom means is positioned against such a pile, said blade means including a plurality of substantially platelike blade members, each of said blade members being attached to said first and second endless chain members and extending transversely of and outwardly past said first and second boxlike members of said boom means for effecting a cave-off of the bulk material in the pile as bulk material is reclaimed from the pile.

2. The apparatus of claim 1 in which the longitudinal axis of said boom means is in a vertical plane which passes through the longitudinal axis of said wheeled vehicle.

3. The apparatus of claim 1 in which is included piston means for causing said boom means to pivot relative to said wheeled vehicle.

4. Apparatus for reclaiming bulk material from a pile of such material, said apparatus comprising: a self-propelled wheeled vehicle having front and rear ends; an elongated boom means having fore and aft ends; pivot means for pivotally mounting said aft end of said boom means to said front end of said wheeled vehicle with the longitudinal axis of said boom means being in a vertical plane which passes through the longitudinal axis of said wheeled vehicle; endless belt-like means movably positioned about said boom means; guide means attached to said boom means for guiding said endless belt-like means lengthwise around said boom means, said guide means including a plurality of substantially C-shaped members mounted on the upper and lower edges of said boom means, each of said C-shaped members having an outwardly-directed opening therethrough adjacent the lowermost portion thereof for allowing passage therethrough of the bulk material being reclaimed by said apparatus thereby alleviating any trappage within said guide means of any of the bulk material, each of said C-shaped members mounted on the upper edge of said boom means having a downwardly and outwardly angled bottom portion for allowing bulk material to pass through said opening thereof aided by the force of gravity; drive means operatively coupled to said endless belt-like means for selectively causing said endless belt-like means to move along said boom means; and blade means attached to said endless belt-like means for moving with said endless belt-like means to reclaim bulk material from a pile of such material when said boom means is positioned against such a pile.

* * * * *